(12) United States Patent  
Choi

(10) Patent No.: US 8,931,205 B2  
(45) Date of Patent: Jan. 13, 2015

(54) LURE

(75) Inventor: Eric Eun-Ha Choi, Fukuoka (JP)

(73) Assignee: Duel Co., Inc., Fukuoka-shi (JP)

( * ) Notice: Subject to any disclaimer, the term of this patent is extended or adjusted under 35 U.S.C. 154(b) by 0 days.

(21) Appl. No.: 14/116,718

(22) PCT Filed: May 10, 2011

(86) PCT No.: PCT/JP2011/060706  
§ 371 (c)(1),  
(2), (4) Date: Nov. 8, 2013

(87) PCT Pub. No.: WO2012/153385  
PCT Pub. Date: Nov. 15, 2012

(65) Prior Publication Data  
US 2014/0068997 A1 Mar. 13, 2014

(51) Int. Cl.  
*A01K 85/00* (2006.01)  
*A01K 85/01* (2006.01)  
*A01K 85/16* (2006.01)

(52) U.S. Cl.  
CPC .................. *A01K 85/00* (2013.01); *A01K 85/01* (2013.01); *A01K 85/16* (2013.01)  
USPC .......................... 43/42.33; 43/42.34; 43/42.32

(58) Field of Classification Search  
CPC ....................................................... A01K 85/00  
USPC .............. 43/42.32, 42.33, 42.34, 42.09, 17.6  
See application file for complete search history.

(56) References Cited

U.S. PATENT DOCUMENTS

| | | | | | |
|---|---|---|---|---|---|
| 1,180,753 | A | * | 4/1916 | Zeigler | 43/42.32 |
| 1,323,458 | A | * | 12/1919 | Dills | 43/42.33 |
| 1,473,420 | A | * | 11/1923 | Doering | 43/42.32 |
| 1,555,029 | A | * | 9/1925 | Russell | 43/42.32 |
| 1,639,863 | A | * | 8/1927 | Sinclair et al. | 43/42.32 |
| 1,698,964 | A | * | 1/1929 | Pagin | 43/42.34 |
| 1,776,090 | A | * | 9/1930 | Shroyer | 43/42.09 |
| 1,881,823 | A | * | 10/1932 | McKenzie | 43/42.33 |

(Continued)

FOREIGN PATENT DOCUMENTS

| | | |
|---|---|---|
| CN | 101926310 A | 12/2010 |
| JP | 60-114662 U | 8/1985 |

(Continued)

OTHER PUBLICATIONS

Extended European Search Report dated Dec. 13, 2013, issued in corresponding European Patent Application No. 11864961.5 (6 pages).

(Continued)

*Primary Examiner* — Darren W Ark  
(74) *Attorney, Agent, or Firm* — Westemann, Hattori, Daniels & Adrian, LLP

(57) ABSTRACT

A lure of the present invention has a hollow portion 2 therein, the body 3 being made of a translucent material. A body inner wall surface forming the hollow portion 2 has a polyhedral structure including a first plane 61 and a second plane 62 connected to the first plane 61, and a multilayer colored region 7 including a first colored portion 71 and a second colored portion 72 stacked on the first colored portion 71, the second colored portion 72 having a color that is different from that of the first colored portion 71, is provided on the first plane 61 or a body outer wall surface corresponding to the first plane 61. The lure of the present invention varies in color depending on the viewing direction.

7 Claims, 17 Drawing Sheets

(56) References Cited

U.S. PATENT DOCUMENTS

| | | | | |
|---|---|---|---|---|
| 2,078,816 A | * | 4/1937 | Shenitz | 43/17.6 |
| 2,116,994 A | * | 5/1938 | Bear | 43/42.33 |
| 2,117,206 A | * | 5/1938 | Neff | 43/42.34 |
| 2,127,761 A | * | 8/1938 | Beck | 43/42.33 |
| 2,163,666 A | * | 6/1939 | Carter et al. | 43/42.33 |
| 2,188,753 A | * | 1/1940 | Jennings | 43/42.32 |
| 2,192,563 A | * | 3/1940 | Starkey | 43/42.34 |
| 2,309,521 A | * | 1/1943 | Mabee | 43/42.33 |
| 2,338,577 A | * | 1/1944 | Divine | 43/42.34 |
| 2,467,244 A | * | 4/1949 | Van Hee et al. | 43/42.33 |
| 2,593,792 A | * | 4/1952 | Reckler | 43/42.33 |
| 2,599,035 A | * | 6/1952 | Wing | 43/42.33 |
| 2,641,080 A | * | 6/1953 | Wise | 43/42.33 |
| 2,670,559 A | * | 3/1954 | Webb et al. | 43/42.33 |
| 2,694,877 A | * | 11/1954 | Wise | 43/42.33 |
| 2,752,721 A | * | 7/1956 | Denny | 43/42.33 |
| 3,069,801 A | * | 12/1962 | Mills | 43/42.33 |
| 3,122,853 A | * | 3/1964 | Koonz et al. | 43/42.33 |
| 3,257,751 A | * | 6/1966 | Benttinen et al. | 43/42.33 |
| 3,360,882 A | * | 1/1968 | Belokin, Jr. | 43/42.33 |
| 3,367,060 A | * | 2/1968 | Abercrombie | 43/42.33 |
| 3,423,868 A | * | 1/1969 | Le Master | 43/42.33 |
| 3,494,065 A | * | 2/1970 | Benttinen et al. | 43/42.33 |
| 3,528,189 A | * | 9/1970 | Lilley, Jr. | 43/42.33 |
| 3,540,144 A | * | 11/1970 | Gurka | 43/42.33 |
| 3,631,625 A | * | 1/1972 | Castner | 43/42.33 |
| 3,952,445 A | * | 4/1976 | Liebert | 43/42.34 |
| 4,266,360 A | * | 5/1981 | Smith | 43/42.33 |
| 4,700,504 A | * | 10/1987 | Mattison | 43/42.33 |
| 4,757,631 A | * | 7/1988 | Anson-Smith | 43/42.33 |
| 4,803,793 A | * | 2/1989 | Schellenberg, III | 43/42.33 |
| 4,862,631 A | * | 9/1989 | Wilson et al. | 43/42.33 |
| 4,922,646 A | * | 5/1990 | Basgal | 43/42.33 |
| 5,737,867 A | * | 4/1998 | Tsutsumi et al. | 43/42.33 |
| 6,029,388 A | * | 2/2000 | Yokogawa et al. | 43/17.6 |
| 6,202,337 B1 | * | 3/2001 | Yoshida | 43/42.33 |
| 7,752,801 B2 | * | 7/2010 | Choi | 43/42.34 |
| 8,402,688 B2 | * | 3/2013 | Choi | 43/42.33 |
| 8,567,109 B1 | * | 10/2013 | Grigorovich | 43/42.33 |
| 2008/0163539 A1 | * | 7/2008 | Choi | 43/42.34 |

FOREIGN PATENT DOCUMENTS

| | | | | | |
|---|---|---|---|---|---|
| JP | 02-105348 U | | 8/1990 | | |
| JP | 05137479 A | * | 6/1993 | | A01K 85/00 |
| JP | 09154438 A | * | 6/1997 | | A01K 85/00 |
| JP | 09224529 A | * | 9/1997 | | A01K 85/00 |
| JP | 09248100 A | * | 9/1997 | | A01K 85/00 |
| JP | 9-289845 A | | 11/1997 | | |
| JP | 09289845 A | * | 11/1997 | | A01K 85/00 |
| JP | 10056916 A | * | 3/1998 | | A01K 85/00 |
| JP | 10-127208 A | | 5/1998 | | |
| JP | 10-127209 A | | 5/1998 | | |
| JP | 10127208 A | * | 5/1998 | | A01K 85/00 |
| JP | 10191837 A | * | 7/1998 | | A01K 85/00 |
| JP | 11123037 A | * | 5/1999 | | A01K 85/00 |
| JP | 2000032876 A | * | 2/2000 | | A01K 85/00 |
| JP | 2000093046 A | * | 4/2000 | | A01K 85/00 |
| JP | 2000125702 A | * | 5/2000 | | A01K 85/00 |
| JP | 2000184838 A | * | 7/2000 | | A01K 85/00 |
| JP | 2000217467 A | * | 8/2000 | | A01K 85/00 |
| JP | 2000333558 A | * | 12/2000 | | A01K 85/00 |
| JP | 2001103871 A | * | 4/2001 | | A01K 85/00 |
| JP | 2001197847 A | * | 7/2001 | | A01K 85/00 |
| JP | 2002034391 A | * | 2/2002 | | A01K 85/00 |
| JP | 2003038065 A | * | 2/2003 | | A01K 85/00 |
| JP | 2004222541 A | * | 8/2004 | | A01K 85/00 |
| JP | 2005192471 A | * | 7/2005 | | A01K 85/00 |
| JP | 2006-55062 A | | 3/2006 | | |
| JP | 2006055062 A | * | 3/2006 | | A01K 85/00 |
| JP | 2006141285 A | * | 6/2006 | | A01K 85/00 |
| JP | 2007068474 A | * | 3/2007 | | A01K 85/00 |
| JP | 2007312765 A | * | 12/2007 | | A01K 85/00 |
| JP | 2008283876 A | * | 11/2008 | | A01K 85/00 |
| JP | 2010-154762 A | | 7/2010 | | |
| JP | 2010154762 A | * | 7/2010 | | A01K 85/00 |

OTHER PUBLICATIONS

International Search Report dated Aug. 16, 2011, issued in corresponding application No. PCT/JP2011/060706.

Written Opinion of the International Searching Authority dated Aug. 16, 2011, issued in corresponding application No. PCT/JP2011/060706.

Office Action dated Jul. 8, 2014, issued in corresponding Chinese Patent Application No. 201180070701.7, with Partial English Translation (13 pages).

\* cited by examiner

LURE

TECHNICAL FIELD

The present invention relates to a lure used for fishing.

BACKGROUND ART

The lure includes a body designed to resemble a little fish, a shrimp, or the like, and a fishhook attached to the body. The lure is a kind of fishing gear that is coupled to a line and thrown into the sea and the like for use. When such lure is travelling through water, target fishes become interested in the lure, confuse the lure with an actual food and bite the lure. In this specification, "target fishes" refer to targets for fishing using the lure, and include cuttlefish and octopus.

To improve biting by the target fishes, lures of various colors have been offered.

For example, in a publicly known lure (artificial bait), a plurality of long projections are formed on the outer surface of the body at predetermined intervals, a first colored portion is provided on one side surface of each of the long projections, and a second colored portion having a different color from the first colored portion is provided on the other side surface of each of the long projections (Patent Document 1).

In the lure disclosed in Patent Document 1, the first colored portion is provided on the one side surface of each of the plurality of long projections formed on the body outer surface, and the second colored portion is provided on the other side surface of each of the long projections. Thus, when the lure is viewed from one side, only the color of the first colored portions is viewable. In contrast, when the lure is viewed from the other side, only the color of the second colored portions is viewable. The lure varies in color depending on the viewing direction as described above, which is excellent in the biting property for target fishes.

However, since, in the conventional lure, the one side surfaces of the plurality of long projections must be colored in a predetermined color, and the other side surfaces of the long projections must be colored in a color that is different from the predetermined color, the selective coating treatment is inconvenient.

[Patent Document 1]

Japanese Unexamined Patent Publication No. 2006-55062

An object of the present invention is to provide a lure that can be manufactured relatively readily, and varies in color depending on the viewing direction.

SUMMARY OF INVENTION

The lure of the present invention includes a body having a hollow portion therein, the body being made of a translucent material. A body inner wall surface forming the hollow portion has a polyhedral structure including a first plane and a second plane connected to the first plane, and a multilayer colored region including a first colored portion and a second colored portion stacked on the first colored portion, the second colored portion having a color that is different from that of the first colored portion, is provided on the first plane or a body outer wall surface corresponding to the first plane.

In a preferable lure of the present invention, a core member is provided in the hollow portion of the body so as to divide the hollow portion of the body into two spaces extending in a long-axis direction, and at least one surface of the core member has light reflectivity.

In a preferable lure of the present invention, the one surface of the core member is substantially orthogonal to the first plane.

In a preferable lure of the present invention, the first plane is located on the upper side of the body, and the second plane is located on the lateral side of the body, and the second plane is connected to the first plane with an obtuse angle with respect to the first plane.

In a preferable lure of the present invention, when the body is cut at two positions in a long-axis direction of the body along a plane orthogonal to the long axis, the sectional shape of the body inner wall surface cut at the one position is a hexagon, and the sectional shape of the body inner wall surface cut at the other position is an octagon.

In a preferable lure of the present invention, the whole or a part of the body inner wall surface has minute irregularities.

The lure of the present invention varies in color depending on the viewing direction (including variation in the color pattern).

The lure of the present invention can be colored relatively readily. Therefore, the present invention can provide a lure that can be manufactured with low manufacturing costs relatively readily.

BRIEF DESCRIPTION OF THE DRAWINGS

In FIG. 9, the core member is omitted.

In FIG. 11, the core member is omitted.

In FIG. 13, the core member is omitted.

In FIG. 14, the core member is omitted.

In FIG. 15, the core member is omitted.

DESCRIPTION OF EMBODIMENTS (First Embodiment)

Figure 1:
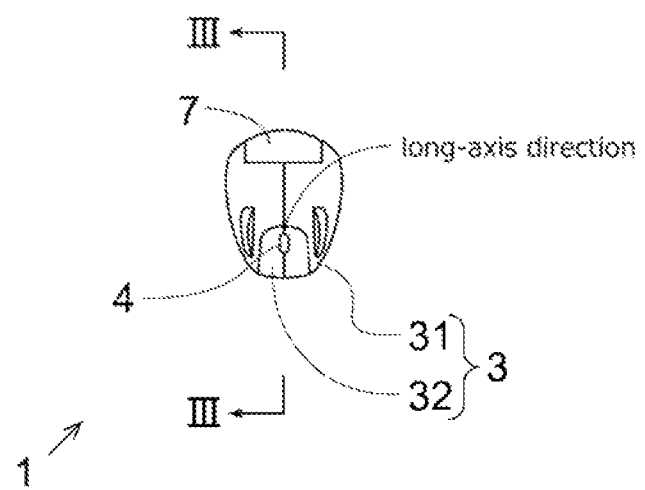
FIG. 1 is a front view of a lure in First embodiment.
Figure 2:
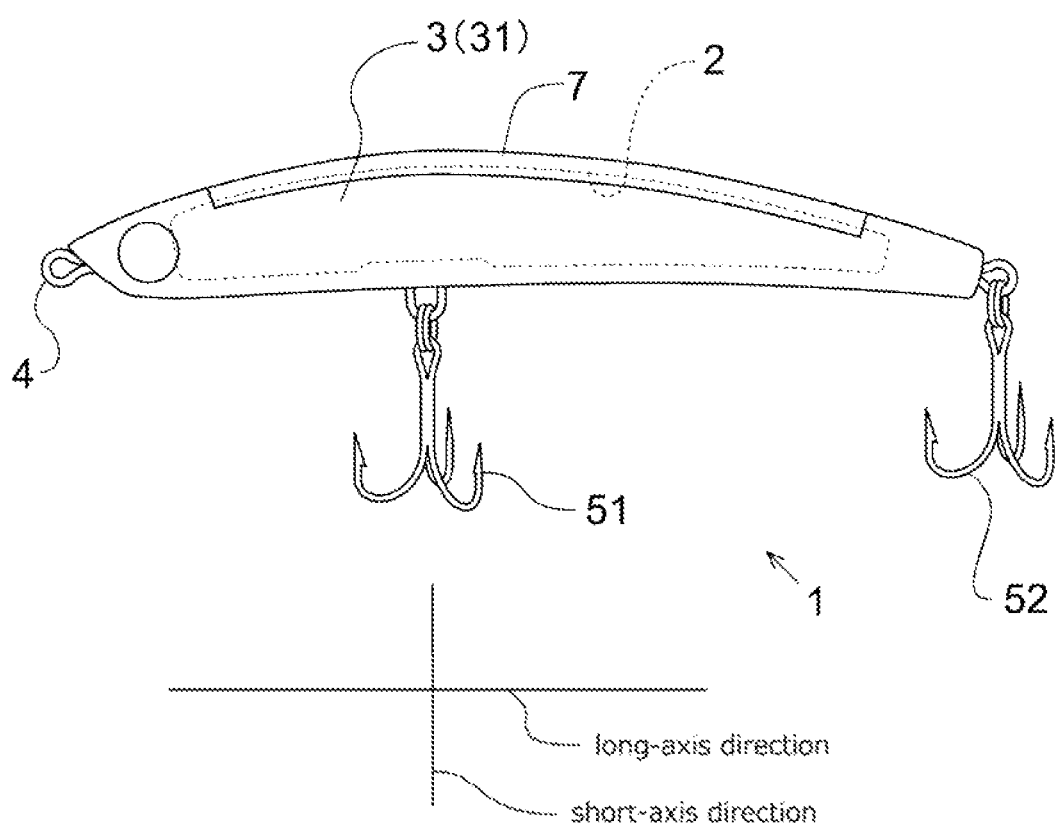
FIG. 2 is a side view of the lure.

The present invention will be described below with reference to figures.

FIG. 1 to FIG. 5 show a lure 1 of the present invention.

The lure 1 includes a body 3 having a hollow portion 2 therein, a connecting portion 4 provided at a front end portion of the body 3 for connecting a line, and fishhooks 51 and 52 attached to the body 3.

The body 3 is made of a translucent material. The body 3 is hollow, and the hollow portion 2 is a space (cavity) surrounded with a body inner wall surface.

The body inner wall surface has a polyhedral structure including a first plane 61 and a second plane 62. A multilayer colored region 7 is provided on the first plane 61 or a body outer wall surface corresponding to the first plane 61. This region 7 includes a first colored portion 71 and a second colored portion 72 stacked on the first colored portion 71. The second colored portion 72 has a color that is different from that of the first colored portion 71.

A core member 8 is provided in the hollow portion 2.

Hereinafter, the present invention is specifically described.

[Summary of Body]

The outer shape of the body 3 (that is, the overall shape of the body outer wall surface) is designed to resemble a small fish, for example. The illustrated overall shape of the body outer wall surface is shaped like a small fish extending in a long-axis direction. The long-axis direction is a direction parallel to a line connecting the front end portion to the rear end portion of the body 3. When the lure 1 is viewed from the side as in FIG. 2, the long-axis direction corresponds to a horizontal direction in the figure.

The body outer wall surface may be a moderately curved surface, or may wholly or partially has a plurality of irregularities.

When the body outer wall surface has irregularities, the irregular shape is not specifically limited. Examples of the irregular shape include (1) scale-like shape that resembles fish scale, (2) a plurality of oblong stripe-like protrusions extending in a short-axis direction on the body outer wall surface are provided in the long-axis direction of the body 3, (3) a plurality of oblong stripe-like protrusions extending in the long-axis direction on the body outer wall surface are provided in the short-axis direction of the body 3.

The short-axis direction is a direction orthogonal to the long-axis direction. When the lure 1 is viewed from the side as in FIG. 2, the short-axis direction corresponds to a longitudinal direction in the figure.

The body 3 is made of a translucent material.

The translucent material refers to a material that transmits light to the extent that a color in the body 3 can be viewed from the outside of the body 3. That is, the body 3 may be transparent and colorless, or transparent and colored (semitransparent).

Preferably, the body 3 has a light transmittance of 60% or more, more preferably 70% or more, and particularly preferably 80% or more. With the body 3 having a light transmittance of 60% or more, light reflected from the inside of the body 3 can be suitably viewed from the outside of the body 3.

However, the light transmittance is measured according to the method prescribed in JIS K 7105-1981 (plastic optical characteristic test method): light transmittance (%)=(T2/T1)×100, where the T2 is the full light transmitted amount (full amount of light transmitting a test piece) and the T1 is the amount of incident light.

The material for the body 3 is not particularly limited, and may be ABS resin, urethane resin, acrylic resin, olefin resin such as polypropylene, or synthetic resin mixture including two or more types of synthetic resin.

Figure 6:
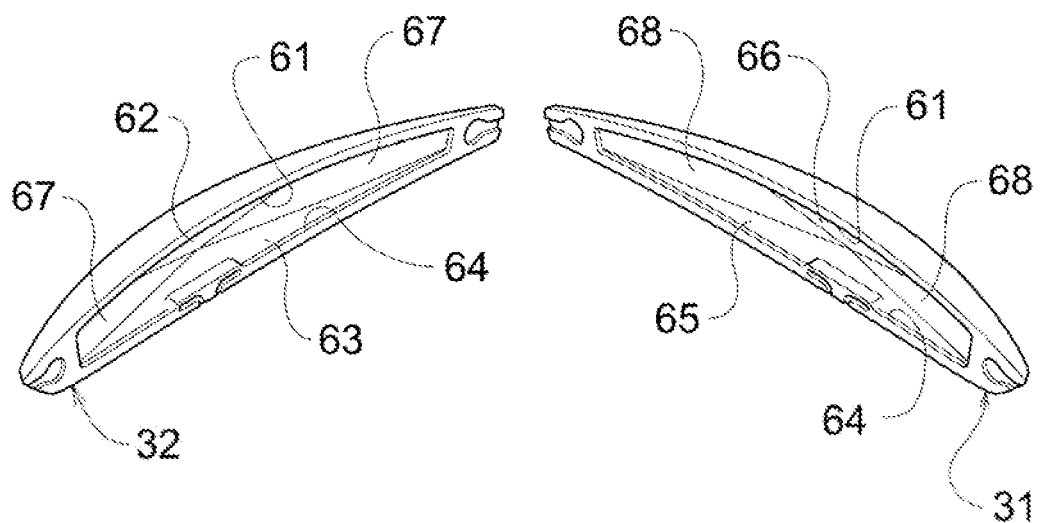
FIG. 6 is a perspective exploded view of a body of the lure.

FIG. 6 is a perspective exploded view of the body.

The body 3 having the hollow portion 2 is generally constituted by bonding a pair of divided bodies 31 and 32 each formed of a molded body having a predetermined thickness as shown in FIG. 6 with an adhesive or the like.

The pair of divided bodies 31 and 32 are symmetrical. The pair of divided bodies 31 and 32 may be formed by molding synthetic resin according to any publicly known method (for example, injection molding).

The thickness of the body 3 (the thickness of the divided bodies 31 and 32) is appropriately set in consideration of the durability of the body 3, and is generally, in the range of about 0.5 mm to 5.0 mm, preferably in the range of about 0.5 mm to 3.0 mm, and more preferably in the range of about 0.8 mm to 2.5 mm.

[Structure of Body Inner Wall Surface]

The body inner wall surface forming the hollow portion 2 of the body 3 has a polyhedral structure constituted by connecting a plurality of planes around the long axis of the body 3.

The body inner wall surface may have the same polyhedral structure (for example, hexahedral structure) on the whole, or may be formed of a combination of different polyhedrons.

The illustrated body inner wall surface has different polyhedral structures in the long-axis direction (formed of a combination of different polyhedrons).

Specifically, the body inner wall surface in this embodiment is formed of a combination of tetrahedrons, hexahedrons, and octahedrons.

Figure 3:
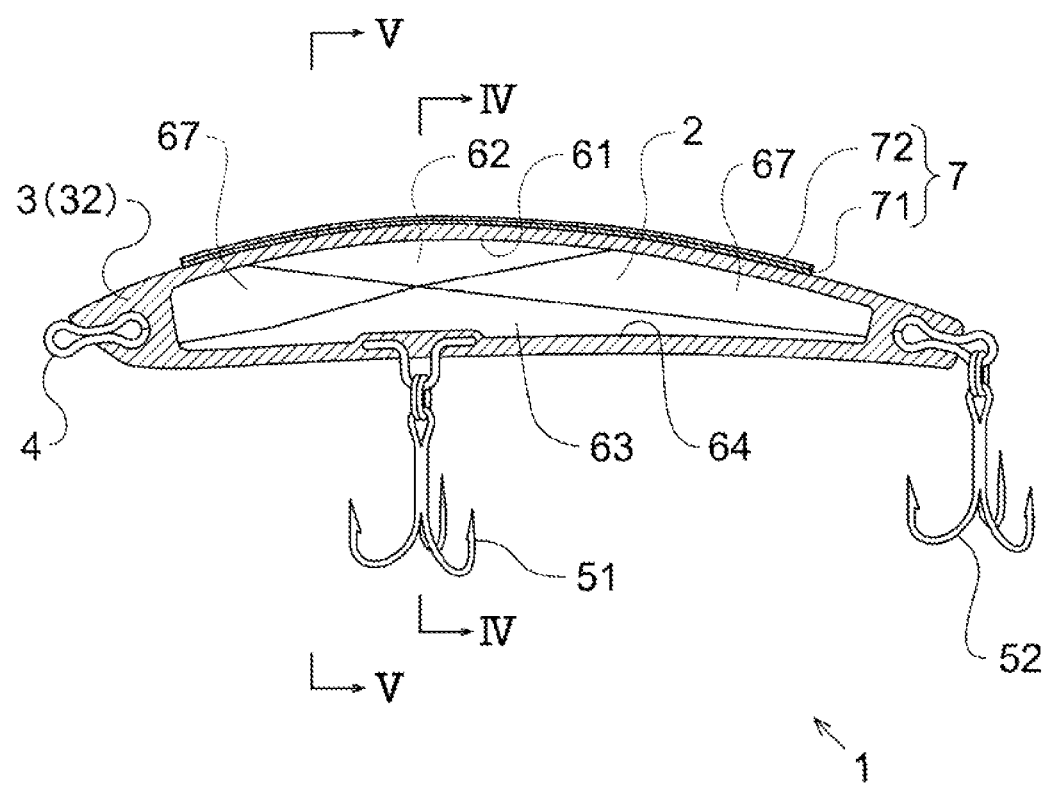
FIG. 3 is a sectional view taken along a line III-III in FIG. 1. The sectional view cut along the line III-III is hereinafter referred to as longitudinal sectional view. In the longitudinal sectional view, the cross section of a core member should appear, but in FIG. 3, the cross section of the core member is omitted.
Figure 4:
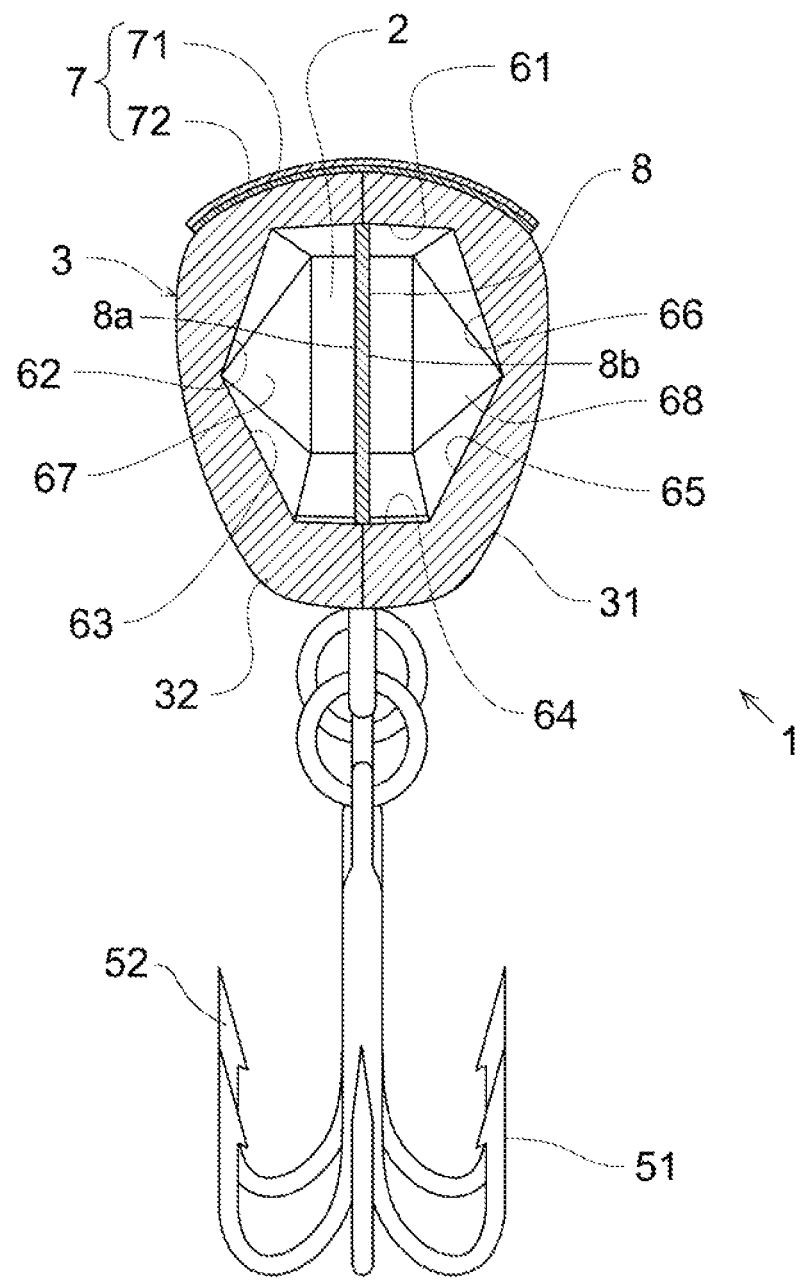
FIG. 4 is an enlarged sectional view taken along a line IV-IV in FIG. 3.

The body inner wall surface has a hexahedral structure constituted by connecting a first plane 61, a second plane 62, a third plane 63, a fourth plane 64, a fifth plane 65, and a sixth plane 66 in this order around the long axis, at the center in the long-axis direction (Refer to FIG. 3 and FIG. 4).

Figure 5:
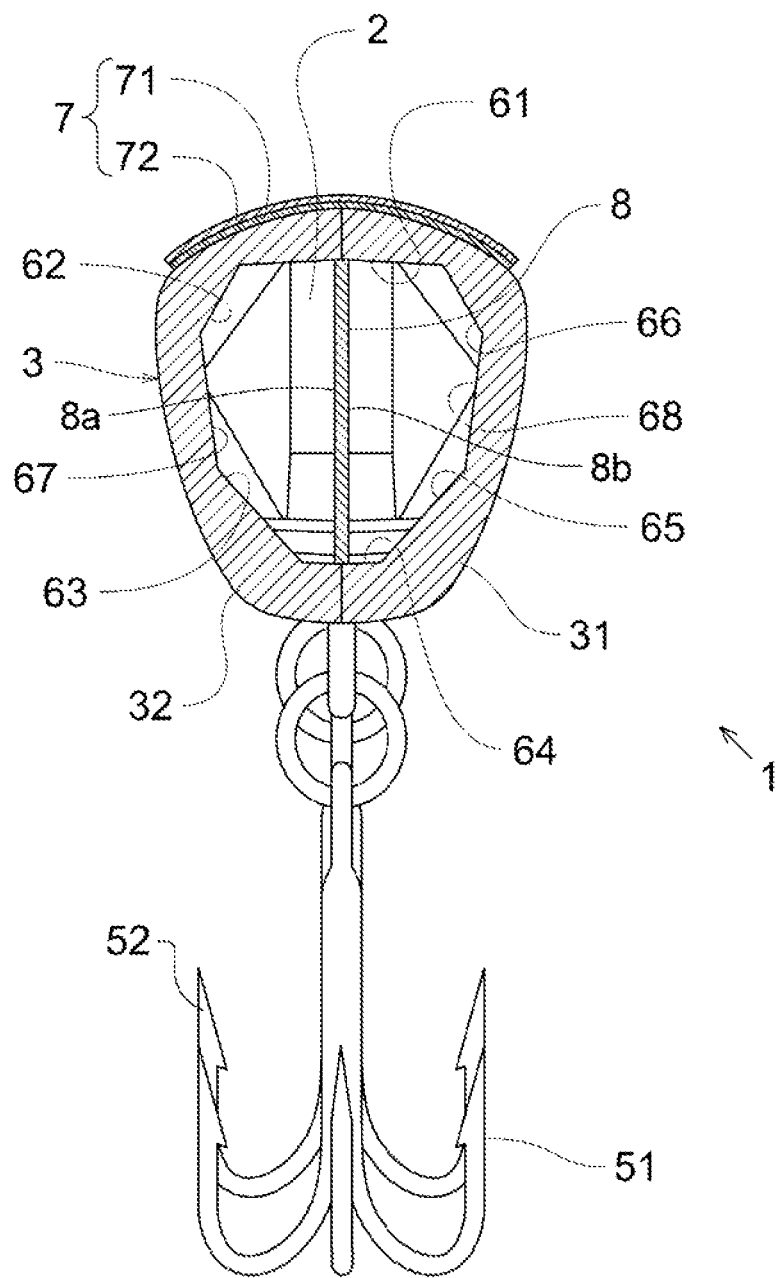
FIG. 5 is an enlarged sectional view taken along a line V-V in FIG. 3.

The body inner wall surface has an octahedral structure constituted by connecting the first plane 61, the second plane 62, a seventh plane 67, the third plane 63, the fourth plane 64, the fifth plane 65, an eighth plane 68, and the sixth plane 66 in this order around the long axis, each on the front side portion and the rear side portion with respect to the center in the long-axis direction (Refer to FIG. 3 and FIG. 5). That is, in the two octahedral structures, in addition to the first plane 61 to sixth plane 66, the seventh plane 67 is interposed between the second plane 62 and the third plane 63, and the eighth plane 68 is interposed between the fifth plane 65 and the sixth plane 66.

The body inner wall surface has a tetrahedral structure constituted by connecting the first plane 61, the seventh plane 67, the fourth plane 64, and an eighth plane 68 in this order around the long axis, each on the vicinity of the front end portion and the rear end portion.

Accordingly, the body inner wall surface is constituted by combining one tetrahedral structure, one octahedral structure, one hexahedral structure, the other octahedral structure, and the other tetrahedral structure in this order from the front end portion toward the rear end portion.

When the body 3 having such body inner wall surface is cut at two different positions in a long-axis direction of the body along a plane orthogonal to the long axis, the sectional shape of the body inner wall surface cut at the one position (having hexahedral structure) is a hexagon as shown in FIG. 4, and the sectional shape of the body inner wall surface cut at the other position (having octahedral structure) is an octagon as shown in FIG. 5.

The first plane 61 to eighth plane 68 all are flat. The flat shape does not mean a flat plane, but means that the first plane 61 to eighth plane 68 are not coarse and irregular. The first plane 61 to eighth plane 68 each are, preferably, a curved and flat surface that is similar to the body outer wall surface.

The first plane 61 is disposed on the back side of the body 3.

The fourth plane 64 is disposed on the abdominal side of the body 3. Accordingly, the fourth plane 64 is vertically opposed to the first plane 61.

An edge of the second plane 62 is connected to the other edge of the first plane 61, such that the first plane 61 is connected to the second plane 62. The angle that the first plane 61 forms with the second plane 62 is not particularly limited, and it is preferably an obtuse angle, more preferably more than 90 degrees and 135 degrees or less, further preferably 93 degrees or more and 130 degrees or less, and particularly preferably 95 degrees or more and 125 degrees or less.

An edge of the sixth plane 66 is connected to the other edge of the first plane 61, such that the first plane 61 is connected to the sixth plane 66. Since the body 3 in this embodiment consists of the pair of symmetrical divided bodies 31 and 32, the second plane 62 and the sixth plane 66 are symmetrical. Accordingly, the angle that the first plane 61 forms with the sixth plane 66 is the same as the angle that the first plane 61 forms with the second plane 62.

The shape of the second plane 62 and the sixth plane 66 when viewed from the side of the lure 1 is an inverted triangle extending in the long-axis direction (Refer to FIG. 3 and FIG. 6).

In the hexahedral structure of the body 3, the edge of the third plane 63 is connected to the other edge of the second plane 62, and the second plane 62 is connected to the third plane 63. The other edge of the third plane 63 is connected to the edge of the fourth plane 64, and the third plane 63 is connected to the fourth plane 64.

The third plane 63 and the fifth plane 65 are symmetrical. Accordingly, the edge of the fifth plane 65 is connected to the other edge of the sixth plane 66, and the fifth plane 65 is connected to the sixth plane 66. The other edge of the fifth plane 65 is connected to the other edge of the fourth plane 64, and the third plane 63 is connected to the fourth plane 64.

The shape of the third plane 63 and the fifth plane 65 when viewed from the side of the lure 1 is a triangle extending in the long-axis direction (Refer to FIG. 3 and FIG. 6).

In the octahedral structure of the body 3, the seventh plane 67 is interposed between the second plane 62 and the third plane 63, and the eighth plane 68 is interposed between the fifth plane 65 and the sixth plane 66.

As described above, the second plane 62 and the sixth plane 66 are shaped like an inverted triangle in a side view and extend in the long-axis direction, and the third plane 63 and the fifth plane 65 are shaped like a triangle in a side view and extend in the long-axis direction. Accordingly, using the hexahedral structure as a reference, the second plane 62 and the third plane 63 are gradually separated from each other in the vertical direction toward the front side portion and the rear side portion of the lure 1 and similarly, the sixth plane 66 and the fifth plane 65 are gradually separated from each other in the vertical direction. While both the planes are gradually separated from each other, the seventh plane 67 and the eighth plane 68 are inserted therebetween.

In the vicinity of the front end portion and the rear end portion of the body 3, the second plane 62, the third plane 63, the fifth plane 65, and the sixth plane 66 are not present. The body inner wall surface has tetrahedral structures each consisting of the first plane 61, the seventh plane 67, the fourth plane 64, and the eighth plane 68 in the vicinity of the respective end portions.

As described above, the body inner wall surface has the hexahedral structure at the center in the long-axis direction, and octahedral structures in front side portion of and in the rear side portion of the hexahedral structure in the lure 1.

For this reason, the seventh plane 67 becomes thinner from the front end portion of the lure 1 toward the center in the long-axis direction (the area becomes smaller), disappears at the center in the long-axis direction of the lure 1 (that is, disappears in the hexahedral structure), and becomes thicker from the center in the long-axis direction toward the rear end portion (the area becomes larger).

Similarly, the eighth plane 68 becomes thinner from the front end portion of the lure 1 toward the center in the long-axis direction (the area becomes smaller), disappears at the center in the long-axis direction of the lure 1 (that is, disappears in the hexahedral structure), and becomes thicker from the center in the long-axis direction toward the rear end portion (the area becomes larger).

[Colored Regions]

The body 3 is colored.

For example, the first colored portion 71 showing a desired color is provided on the body outer wall surface corresponding to the first plane 61, and the second colored portion 72 is provided on the first colored portion 71 so as to cover the first colored portion 71. The second colored portion 72 shows a color that is different from that of the first colored portion 71. A region where the first colored portion 71 and the second colored portion 72 are provided is the multilayer colored region 7.

In the illustrated example, the multilayer colored region 7 is provided on the body outer wall surface corresponding to the entire first plane 61 as well as the body outer wall surface corresponding to each of a part of the second plane 62 and a part of the sixth plane 66. In the lure 1 of the present invention, the multilayer colored region 7 may extend to a part of the second plane 62 and a part of the sixth plane 66. When the multilayer colored region 7 is not provided on the body outer wall surface corresponding to each of the entire second plane 62 and the entire sixth plane 66, the effect of the present invention can be reliably obtained.

On the condition that the first colored portion 71 and the second colored portion 72 look different from each other (that is, are not visually the same as each other), the colors are not specifically limited. The colors of the first colored portion 71 and the second colored portion 72 may be appropriately selected from various colors including a single color such as red, blue, yellow, and silver, a color pattern containing two or more colors, and transparent color. For example, the first colored portion 71 may be colored red, and the second colored portion 72 may be parti-colored in mixed color of blue and yellow. For example, the first colored portion 71 may be colored silver, and the second colored portion 72 may be colored white.

The second colored portion 72 may have a stripe pattern of two or more colors.

The first colored portion 71 and the second colored portion 72 may be filled in the form of a plane, or may be provided in the form of a plurality of dots.

The method of forming the first colored portion 71 and the second colored portion 72 is not particularly limited, and for example, (1) ink of desired color is applied, or (2) a sheet (including a film) or a metal foil such as an aluminum foil of desired color is adhered. In FIG. 4 and FIG. 5, the first colored portion 71 and the second colored portion 72 are shown to be thick. However, it should be noted that the actual first and second colored portions 71 and 72 are extremely thin.

In the (1) coloring treatment using ink, the first colored portion 71 may be formed by applying the ink once, or may be formed by applying the same or different ink twice or more. Similarly, the second colored portion 72 may be formed by applying ink once or twice or more.

The ink may contain microparticles having a high light reflectivity, such as pearl pigment.

A coating layer such as varnish may be applied on the first colored portion 71 and the second colored portion 72 as needed.

According to the present invention, on the condition that the multilayer colored region 7 is provided, the other portions of the body 3 (portions other than the multilayer colored region 7 in the body 3) may be colored in any color. Even when the other portions are colored, the light transmittance of the colored body 3 is preferably 60% or more, more preferably 70% or more, and particularly preferably 80% or more, as described above.

[Core Member]

The core member 8 is, for example, an oblong plate-like member. The core member 8 may be formed of a rigid synthetic resin plate having a thickness of about 0.5 mm to 3 mm, for example. However, the core member 8 is not limited to the plate having the above-mentioned thickness, and for example, may be made of a sheet material such as paper or synthetic resin.

The core member 8 is provided in the hollow portion 2 of the body 3 so as to divide the hollow portion 2 of the body 3 into two spaces extending in the long-axis direction.

The core member 8 is disposed in the hollow portion 2 such that one surface 8a and the other surface 8b of the core member 8 are substantially orthogonal to the first plane 61 and the fourth plane 64.

As shown in FIG. 4 and FIG. 5, the core member 8 is disposed along the bonded portion of the pair of divided bodies 31 and 32.

The core member 8 extends in the long-axis direction. It is preferred that the upper edge of the core member 8 is in contact with the first plane 61 of the body inner wall surface, and the lower edge of the core member 8 is in contact with the fourth plane 64 of the body inner wall surface. The pair of divided bodies 31 and 32 each may have a concave engaging portion extending in the long-axis direction, at the vertical bonded portion, and the upper edge and the lower edge of the core member 8 may engage with the respective concave engaging portions.

The one surface 8a of the core member 8 is one surface of two large surfaces of the core member 8, and the other surface 8b of the core member 8 is the other surface (surface on the opposite side to the one surface 8a).

The one surface 8a and the other surface 8b of the core member 8 have light reflectivity.

For example, by making the core member 8 from a material having light reflectivity, the core member 8 including the one surface 8a and the other surface 8b having light reflectivity can be acquired. Alternatively, by applying light reflection treatment to the one surface 8a and the other surface 8b of the core member 8, the core member 8 including the one surface 8a and the other surface 8b having light reflectivity can be acquired. Examples of the light reflection treatment includes: (1) a light reflective paint is applied to the one surface 8a and the other surface 8b of the core member 8; and (2) a light reflective sheet is adhered to the one surface 8a and the other surface 8b of the core member 8.

Examples of the light reflective sheet include a sheet formed by laminating metal foils such as aluminum foils, a hologram sheet that reflect light in rainbow color due to the prismatic effect, and a fluorescent color reflective sheet.

In the lure 1 of the present invention, the core member 8 made of a material having the light reflectivity may be used, or the core member 8 subjected to the light reflection treatment may be used.

[Other Portions of Lure]

The connecting portion 4 is formed of a ring member fixedly attached to the front end portion of the body 3. The ring member made of metal is generally used.

The connecting portion 4 serves to connect the lure 1 to a line.

For example, a treble hook with three integrated hooks can be adopted as the fishhooks 51 and 52. The fishhooks 51 and 52 are detachably attached to respective ring members fixed to the body 3.

In the illustrated lure 1, the ring members are provided at the center on the abdominal side of the body 3 and at the rear end portion of the body 3.

In use of the lure 1 having such configuration, the line is connected to the connecting portion 4 and then, the lure 1 is thrown into the water. When viewing the outer surface of the translucent body 3 of the lure 1 of the present invention, one can view various light beams reflected from the body outer wall surface, the body inner wall surface, and the core member 8.

The lure 1 of the present invention varies in color depending on the viewing direction of the observer. The variation in color includes variation in color pattern.

Figure 7A:
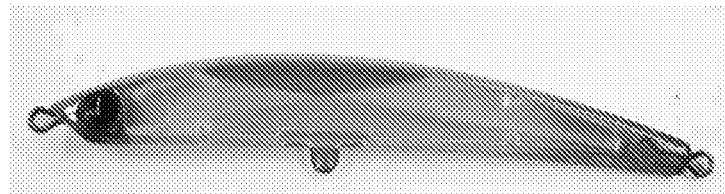
FIG. 7(a) is a photograph of an actually-manufactured lure product when taken from the side.
Figure 7B:
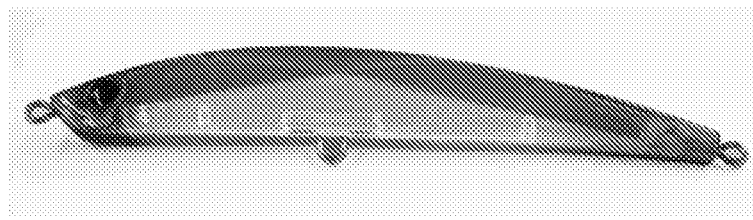
FIG. 7(b) is a photograph of the product when taken from obliquely below.
Figure 7C:
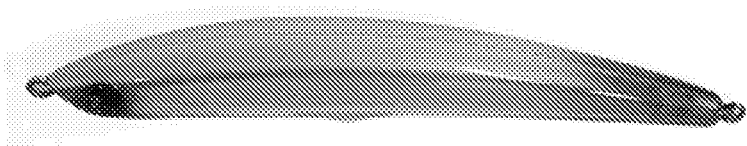
FIG. 7(c) is a photograph of the product when taken from obliquely above.

FIGS. 7(a) to 7(c) show a product of the lure 1 actually manufactured according to the present invention. A body of the product is formed of a transparent ABS resin molded article. The first colored portion of the product is formed by applying pale vermilion ink. The second colored portion of the product is formed by applying white ink containing pearl pigment.

FIG. 7(a) is a photograph acquired by converting a color photograph of the body taken from the side into a grey photograph. At this time, the line of sight is substantially orthogonal to the side surface of the body.

FIG. 7(b) is a photograph acquired by converting a color photograph of the body taken from obliquely below with respect to the state in FIG. 7(a) into a grey photograph.

FIG. 7(c) is a photograph acquired by converting a color photograph of the body taken from obliquely above with respect to the state in FIG. 7(a) into a grey photograph.

As apparent from each of the photographs, in the state shown in FIG. 7(a), the color of the first colored portion (actually pale vermilion, but dark color in the grey photograph) appears in a region corresponding to the sixth plane of the body inner wall surface, and the color of the first colored portion hardly appears in the other region. The color of the second colored portion (close to white in the grey photograph) faintly appears on the upper side of the body. Similarly, when viewed from the opposite side of the body, the color of the first colored portion appears in a region corresponding to the second plane of the body inner wall surface.

In the state shown in FIG. 7(b), the color of the first colored portion (actually pale vermilion, but dark color in the grey photograph) appears in each region corresponding to the first plane and the eighth plane in addition to the sixth plane of the body inner wall surface. Similarly, when viewed from obliquely below of the opposite side of the body, the color of the first colored portion appears in each region corresponding to the first plane and the seventh plane in addition to the second plane of the body inner wall surface.

In the state shown in FIG. 7(c), the color of the first colored portion disappears, and only the color of the second colored portion (close to white in the grey photograph) appears. Similarly, when viewed from obliquely above of the opposite side of the body, only the color of the second colored portion appears.

In this manner, the lure 1 of the present invention varies in color depending on the viewing direction. Further, with the configuration of the lure 1 of the present invention, as compared to that of the conventional lure, the first colored portion 71 and the second colored portion 72 can be formed more readily.

Figure 8A:
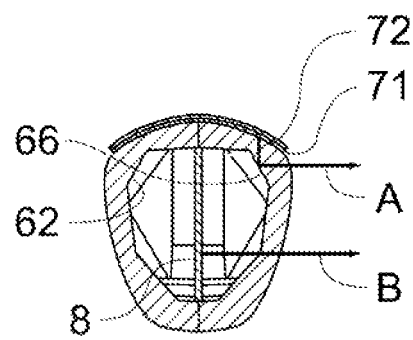
FIGS. 8(a) to 8(c) are reference sectional views for describing the mechanism in which color varies depending on the viewing direction.
Figure 8B:
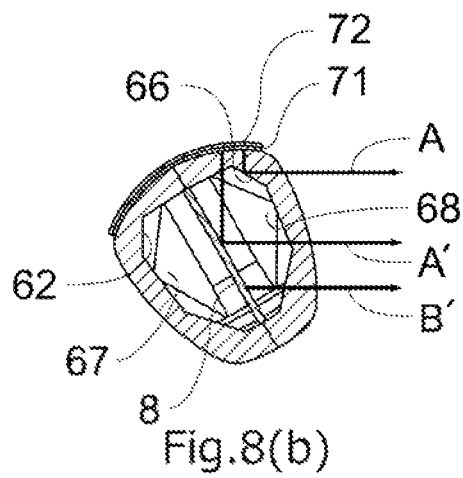
Figure 8C:
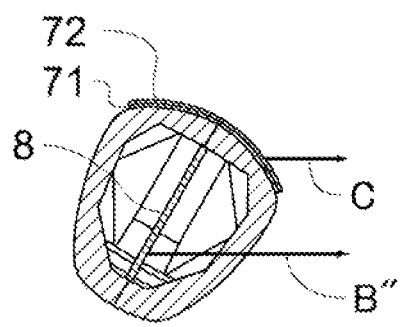

FIGS. 8(a) to 8(c) are reference views for describing the mechanism in which the lure 1 of the present invention varies in color depending on the viewing direction. The mechanism is assumed by the present inventors.

In FIGS. 8(a) to 8(c), the light travelling direction is represented by a thick line with arrow.

FIG. 8(a) corresponds to the state in FIG. 7(a). A light beam A that is reflected on the first colored portion 71 or passes through the first colored portion 71 is reflected on the sixth plane 66 (or the second plane 62) of the body inner wall surface, and is emitted from the body outer wall surface to the outside. Therefore, as shown in FIG. 7(a), the color of the first colored portion 71 appears in the region corresponding to the sixth plane 66 (or the second plane 62) of the body inner wall surface. A light beam B reflected on the core member 8 is emitted from the body outer wall surface to the outside as it is. The light beam B is the light beam reflected on the core member 8 and thus, is different from the color of the first colored portion 71.

FIG. 8(b) corresponds to the state in FIG. 7(b). Light beams A and A' that are reflected on the first colored portion 71 or pass through the first colored portion 71 are reflected on the sixth plane 66 (or the second plane 62) of the body inner wall surface and the core member 8, and are emitted from the body outer wall surface to the outside. Therefore, as shown in FIG. 7(b), the color of the first colored portion 71 appears in the region corresponding to the sixth plane 66 (or the second plane 62) and the eighth plane 68 (or the seventh plane 67) of the body inner wall surface. A part of a light beam B' reflected on the core member 8 is emitted from the body outer wall surface to the outside as it is.

FIG. 8(c) corresponds to the state in FIG. 7(c). A light beam that is reflected on the first colored portion 71 or passes through the first colored portion 71 is hardly emitted from the body outer wall surface to the outside. A light beam B" reflected on the core member 8 is emitted from the body outer wall surface to the outside as it is. A light beam C is reflected on the second colored portion 72. Therefore, as shown in FIG. 7(c), the color of the first colored portion disappears and only the color of the second colored portion appears.

The lure of the present invention is not limited to First embodiment, and may be variously modified in the scope of the present invention. Hereinafter, other embodiments of the present invention will be described. However, only configurations that are different from those in First embodiment will be described, and description of configurations that are the same as those in First embodiment is omitted, and their terms and reference numerals may be used as they are.

(Second Embodiment)

A lure 12 in Second embodiment is different from the lure 1 in First embodiment in that a weight 9 is provided in the hollow portion 2.

Figure 9:
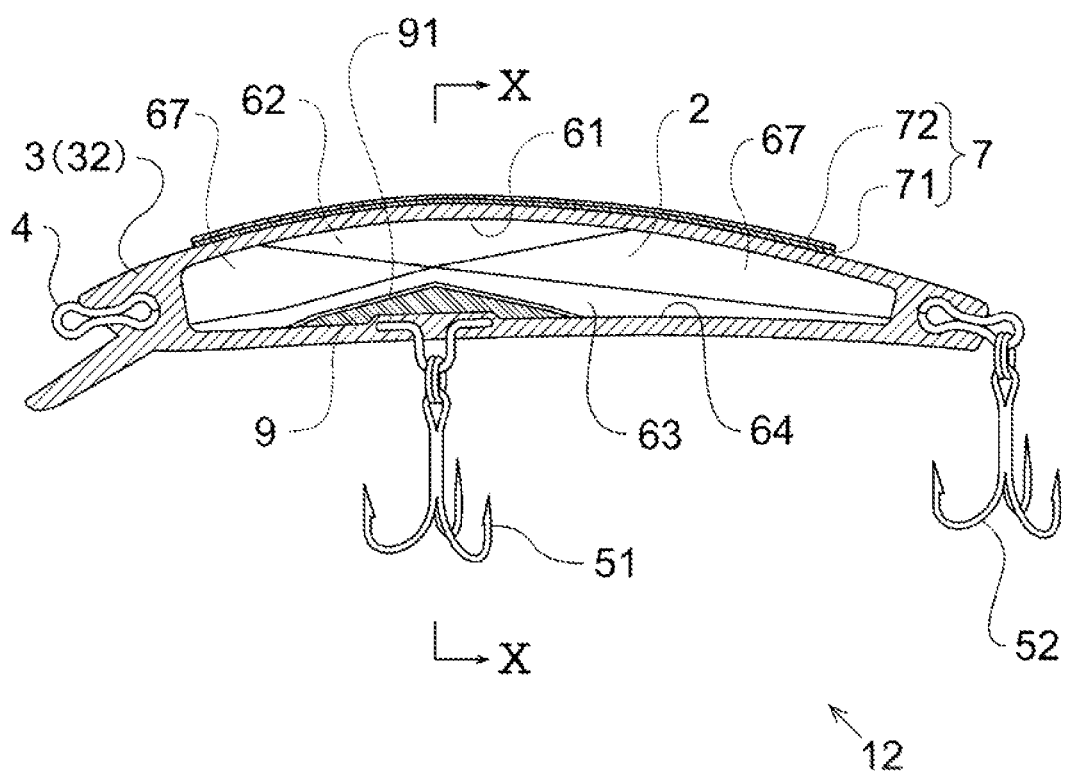
FIG. 9 is a longitudinal sectional view of a lure in Second embodiment.
Figure 10:
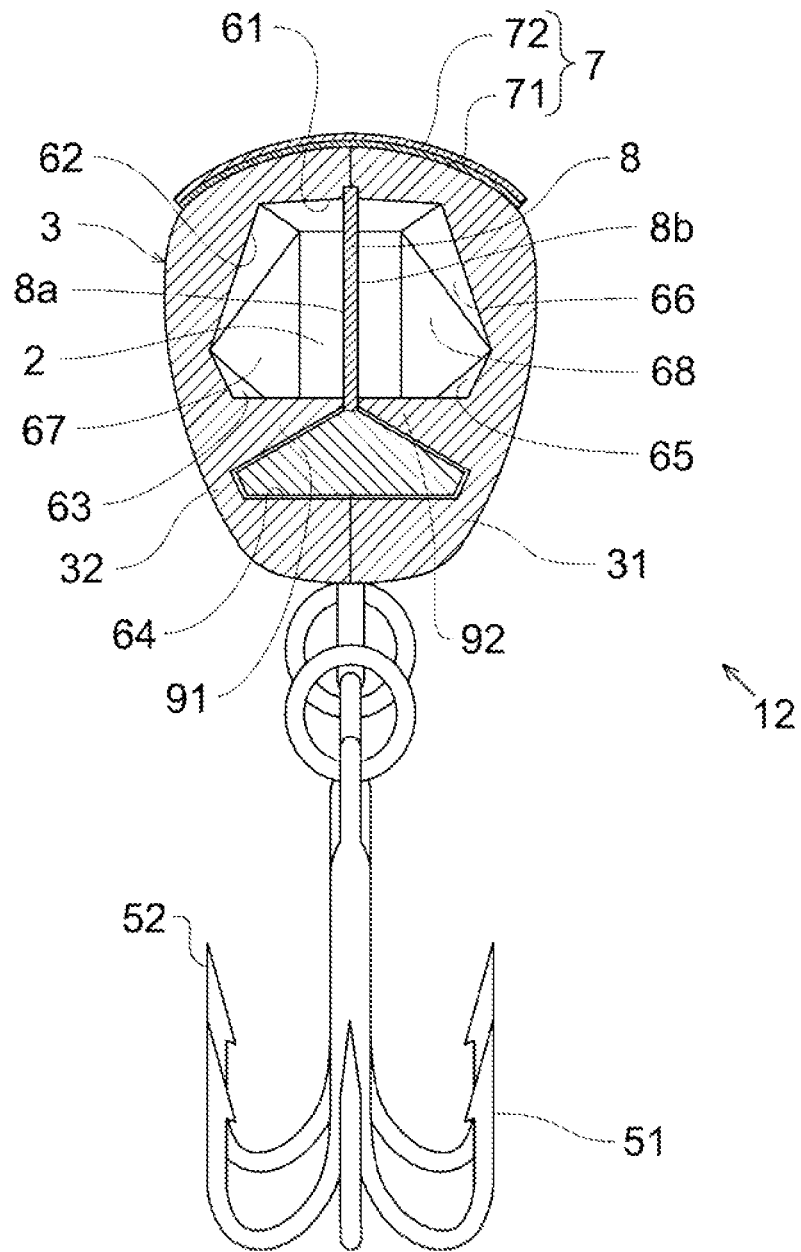
FIG. 10 is an enlarged sectional view taken along a line X-X in FIG. 9.

Specifically, as shown in FIG. 9 and FIG. 10, the weight 9 is provided in a lower portion of the hollow portion 2 of the body 3. The weight 9 is provided at the center of the body 3 in the long-axis direction. However, the weight 9 may be provided on the front side portion or the rear side portion of the body 3.

To form a storage space for the weight 9, a pair of partition walls 91 and 92 are protrudingly provided on the hollow portion 2 of the body 3. For example, one partition wall 91 protrudes inward from the third plane 63, and the other partition wall 92 protrudes inward from the fifth plane 65. The weight 9 is stored in a space surrounded with the pair of partition walls 91 and 92 and the fourth plane 64.

In the lure 12 in Second embodiment, the upper edge and the lower edge of the core member 8 provided in the hollow portion 2 are engaged with respective concave engaging portions formed on the vertical bonded portion of the pair of divided bodies 31 and 32.

Like the lure 1 in First embodiment, the lure 12 in Second embodiment varies in color depending on the viewing direction.

(Third Embodiment)

In First embodiment, the multilayer colored region 7 is provided on the body outer wall surface corresponding to the first plane 61. However, the multilayer colored region 7 may be provided on the first plane 61 of the body inner wall surface.

Figure 11:
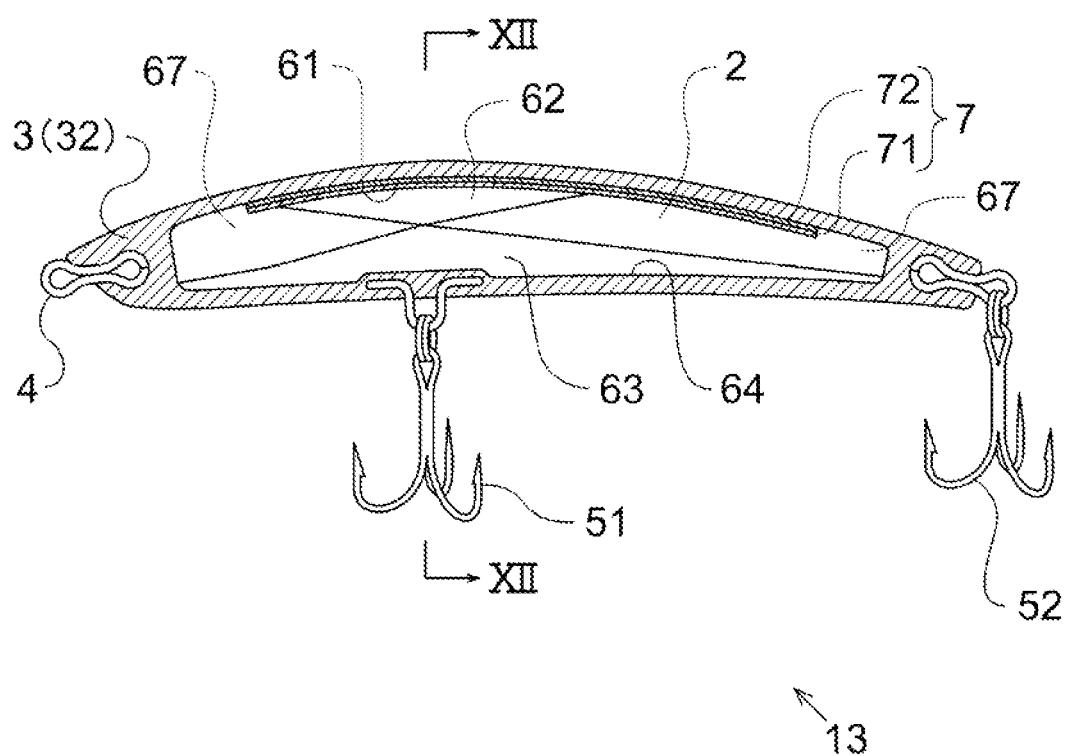
FIG. 11 is a longitudinal sectional view of a lure in Third embodiment.
Figure 12:
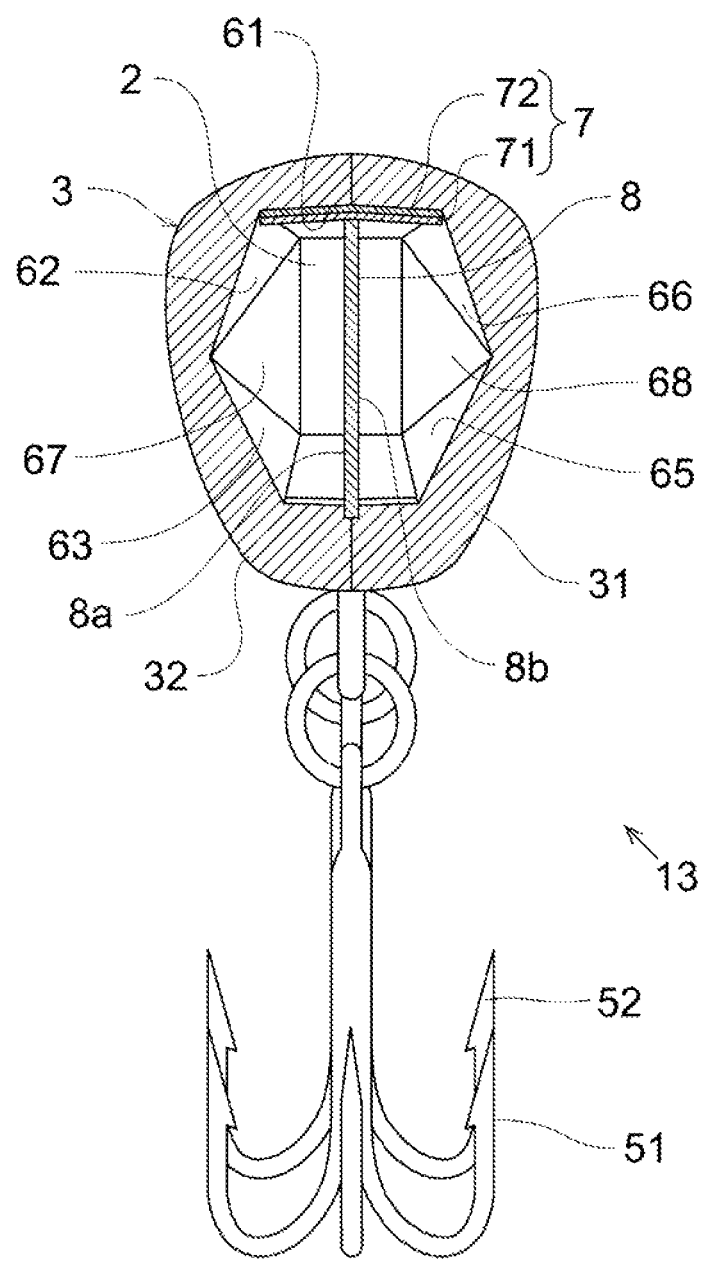
FIG. 12 is an enlarged sectional view taken along a line XII-XII in FIG. 11.

Specifically, as shown in FIG. 11 and FIG. 12, in the lure 13 in Third embodiment, the multilayer colored region 7 is not provided on the body outer wall surface. However, the multilayer colored region 7 having the second colored portion 72 and the first colored portion 71 is provided on the first plane 61 of the body inner wall surface. When the multilayer colored region 7 is provided on the first plane 61, the second colored portion 72 is stacked on the first colored portion 71 as shown in the figures.

(Fourth Embodiment)

In First embodiment, the body inner wall surface has the hexahedral structure and the octahedral structure and however, the body inner wall surface may have only the hexahedral structure or the octahedral structure.

Figure 13:
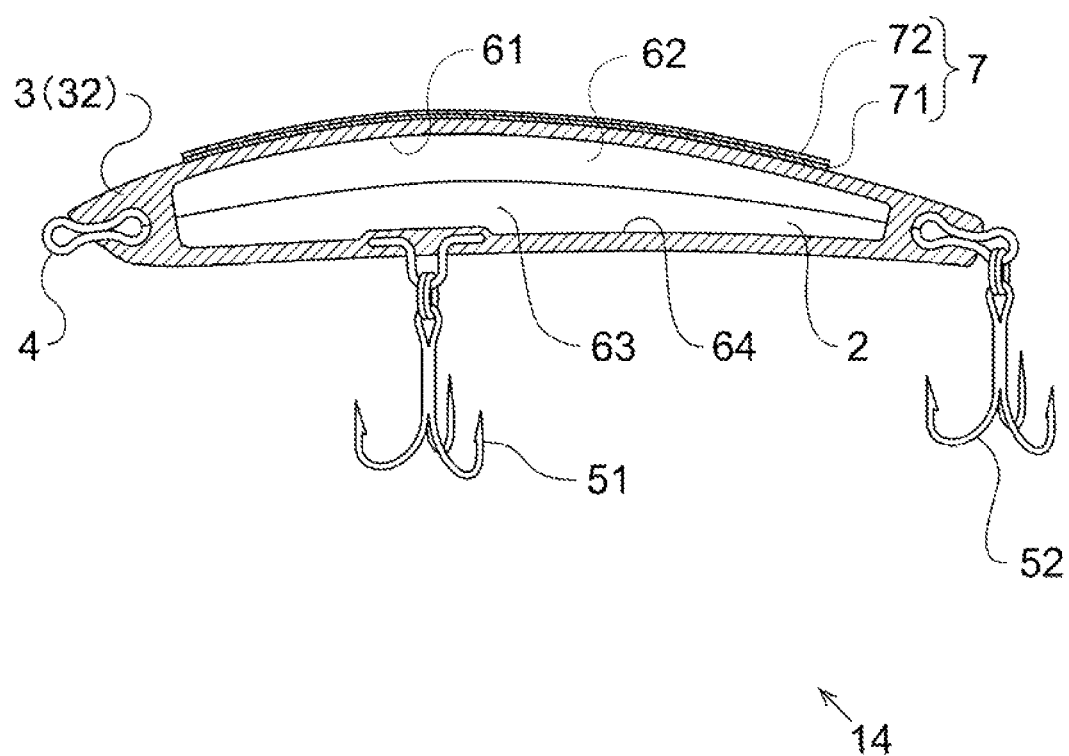
FIG. 13 is a longitudinal sectional view of a lure in Fourth embodiment.

FIG. 13 is a longitudinal sectional view of a lure 14 in Fourth embodiment, in which the body inner wall surface has only the hexahedral structure. In this specification, the longitudinal sectional view shows the cross section taken along the line similar to the line III-III in FIG. 1.

The body inner wall surface of the lure 14 in Fourth embodiment has a hexahedral structure constituted by connecting the first plane 61, the second plane 62, the third plane 63, the fourth plane 64, the fifth plane, and the sixth plane in this order around the long axis. The hexahedral structure of the body inner wall surface extends from the front side portion to the rear side portion of the body 3.

The lure in which the body inner wall surface consists of only the octahedral structure has an octahedral structure constituted by connecting the first plane, the second plane, the seventh plane, the third plane, the fourth plane, the fifth plane, the eighth plane, and the sixth plane in this order around the long axis, from the front side portion to the rear side portion of the body 3.

(Fifth Embodiment)

The body inner wall surface of the lure 1 of present invention needs to have the first plane 61 and the second plane 62 that are connected to each other at the predetermined angle (preferably, the first plane 61, the second plane 62, and the sixth plane 66). Preferably, the angle that the first plane 61 forms with the second plane 62 is an obtuse angle as described above. Similarly, the angle that the first plane 61 forms with the sixth plane 66 is preferably an obtuse angle as described above.

In First embodiment, the first plane 61 of the body inner wall surface is disposed on the upper side (back side) of the body 3. However, the first plane 61 of the body inner wall surface may be disposed on the lower side (abdominal side) of the body 3. In the case where the first plane 61 of the body inner wall surface is disposed on the lower side (abdominal side) of the body 3, the second plane 62 and the like in First embodiment are turned upside down with respect to the first plane 61.

(Sixth Embodiment)

In First embodiment, (1) application of ink and (2) adhesion of sheet are described as the method of forming the first colored portion 71. However, a method that is forming the body 3 by mixing a coloring agent to the forming material of the body 3 may be used.

The body 3 made of the material containing the coloring agent shows color. The color of the body 3 acts as the first colored portion 71. Accordingly, the second colored portion 72 can be provided on the body outer wall surface corresponding to the first plane 61 of the body 3 to constitute the lure 1 of the present invention. In this case, it is no need to form the first colored portion 71, and the color of the body 3 becomes the color of the first colored portion 71. However, the colored body 3 must have the above-mentioned translucency. That is, according to the present invention, the body 3 colored so as not to allow light to pass through cannot be adopted.

In the lure in Sixth embodiment, when viewed from the side, mixed color of the color of the body 3 (the color of the first colored portion 71) and the color of the second colored portion 72 appears. Depending on the viewing direction, only the color of the body 3 appears, or only the color of the second colored portion 72 appears.

(Seventh Embodiment)

Figure 14:
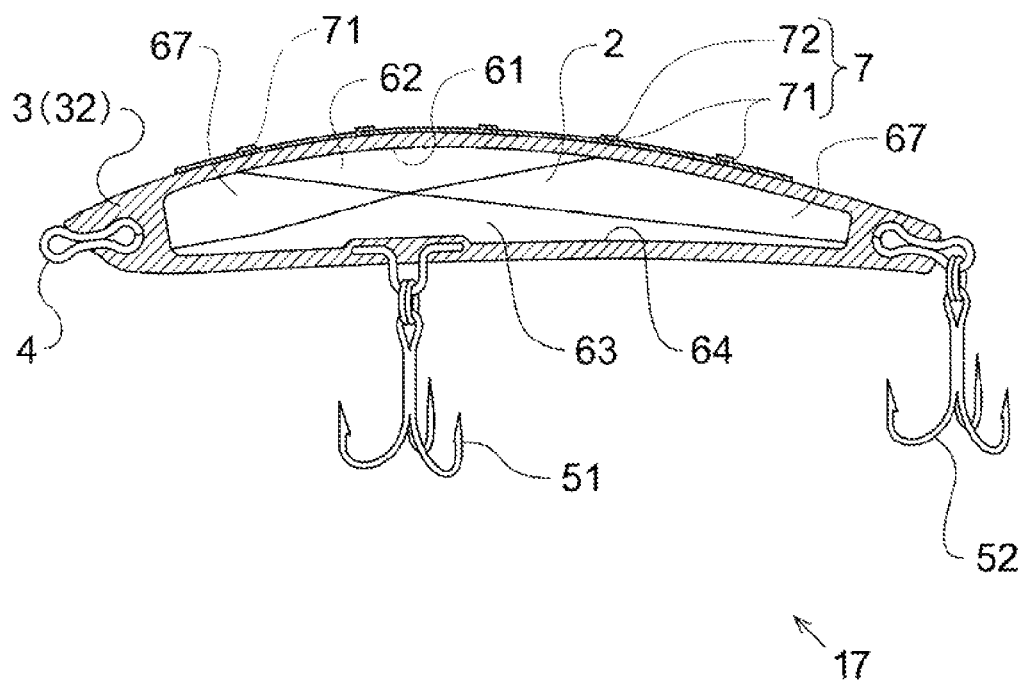
FIG. 14 is a longitudinal sectional view of a lure in Seventh embodiment.

In First embodiment, the first colored portion 71 and the second colored portion 72 are filled in the form of a plane. However, for example, as shown in FIG. 14, the first colored portion 71 may be provided in the form of a plurality of dots, and the second colored portion 72 may be planar so as to cover the dot-like first colored portion 71.

In the case of the dot-like (spot-like) first colored portion 71, when the lure is viewed from above, the dotted color of the first colored portion does not appear. However, when viewed from the side, the dotted color of the first colored portion appears. The lure 1 having the dotted color (that is, particolored pattern appears and disappears) promotes biting of the target fishes, which is preferable. Further, together with the thickness of the body 3 and light reflected on the core member 8, the dotted color gives a three-dimensional appearance to the lure 1.

(Eighth Embodiment)

In First embodiment, the first plane 61 to eighth plane 68 of the body inner wall surface all are flat. However, for example, at least one plane selected from the first plane 61 to eighth plane 68 may be inwardly or outwardly curved plane.

Figure 15:
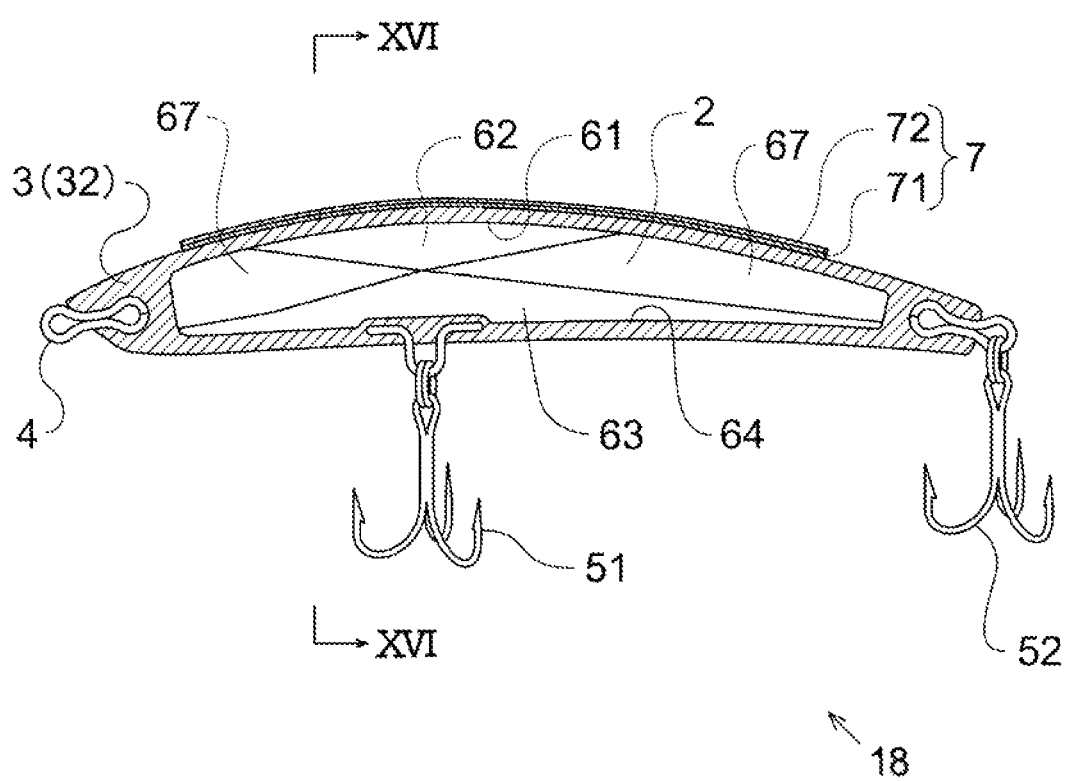
FIG. 15 is a longitudinal sectional view of a lure in Eighth embodiment.
Figure 16:
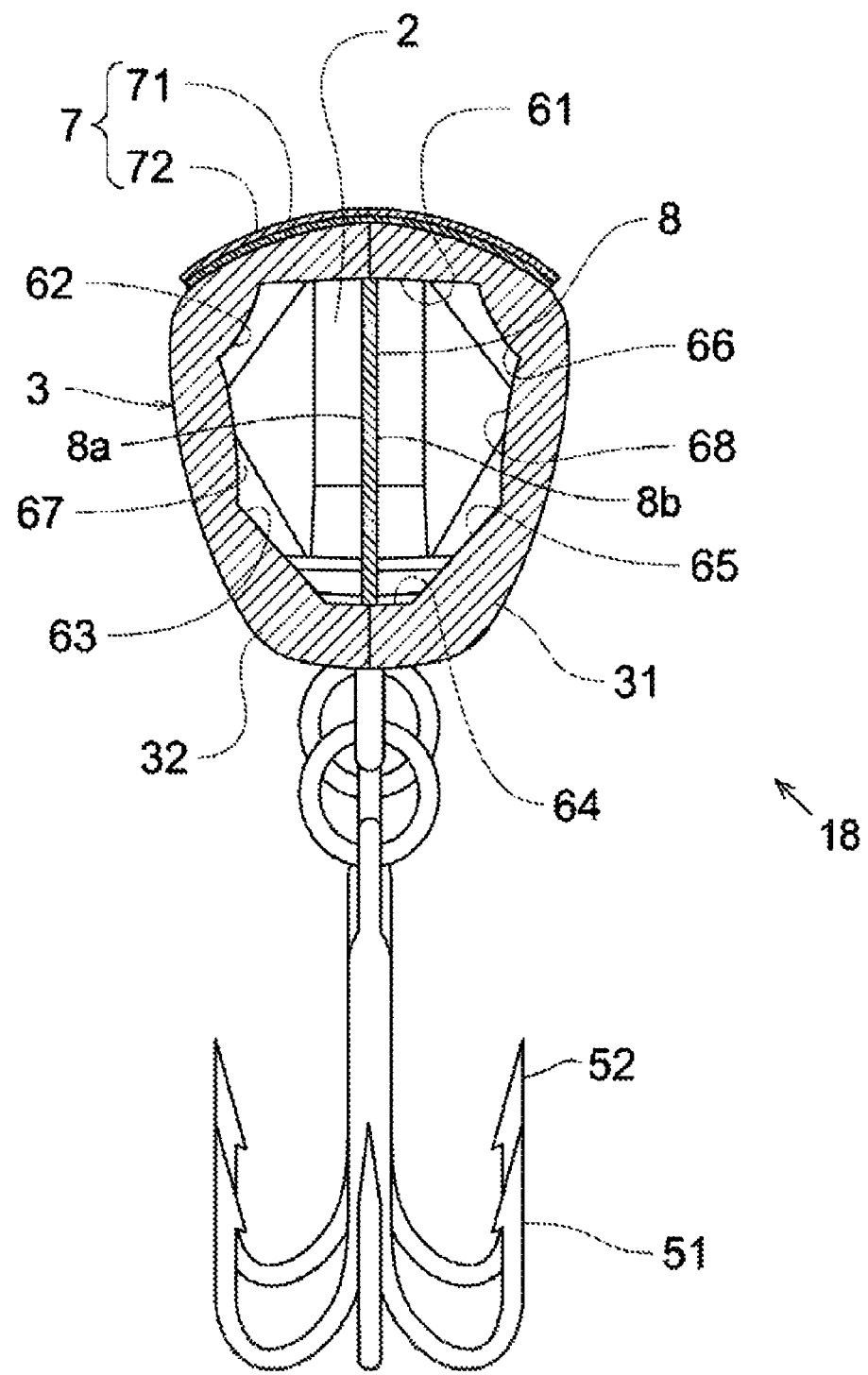
FIG. 16 is an enlarged sectional view taken along a line XVI-XVI in FIG. 15.

FIG. 15 and FIG. 16 show examples of a lure 18 in Eighth embodiment in which any plane is an inwardly or outwardly curved plane. In the lure 18 of this example, the second plane 62, the sixth plane 66, the seventh plane 67 and the eighth plane 68 are each inwardly curved plane, for example.

(Ninth Embodiment)

At least one plane selected from the first plane 61 to eighth plane 68 of the body inner wall surface may have minute irregularities. Since the whole or a part of the body inner wall surface has minute irregularities, light incident on the irregular plane is irregularly reflected. For this reason, when the body 3 is viewed from the side, a faint region and a vivid region in color are generated to constitute the varied lure 1.

A difference in height of the irregular plane is generally, in the range of 0.01 mm to 2 mm, preferably in the range of 0.1 mm to 1.5 mm, and more preferably in the range of 0.2 mm to 1 mm.

Figure 17:
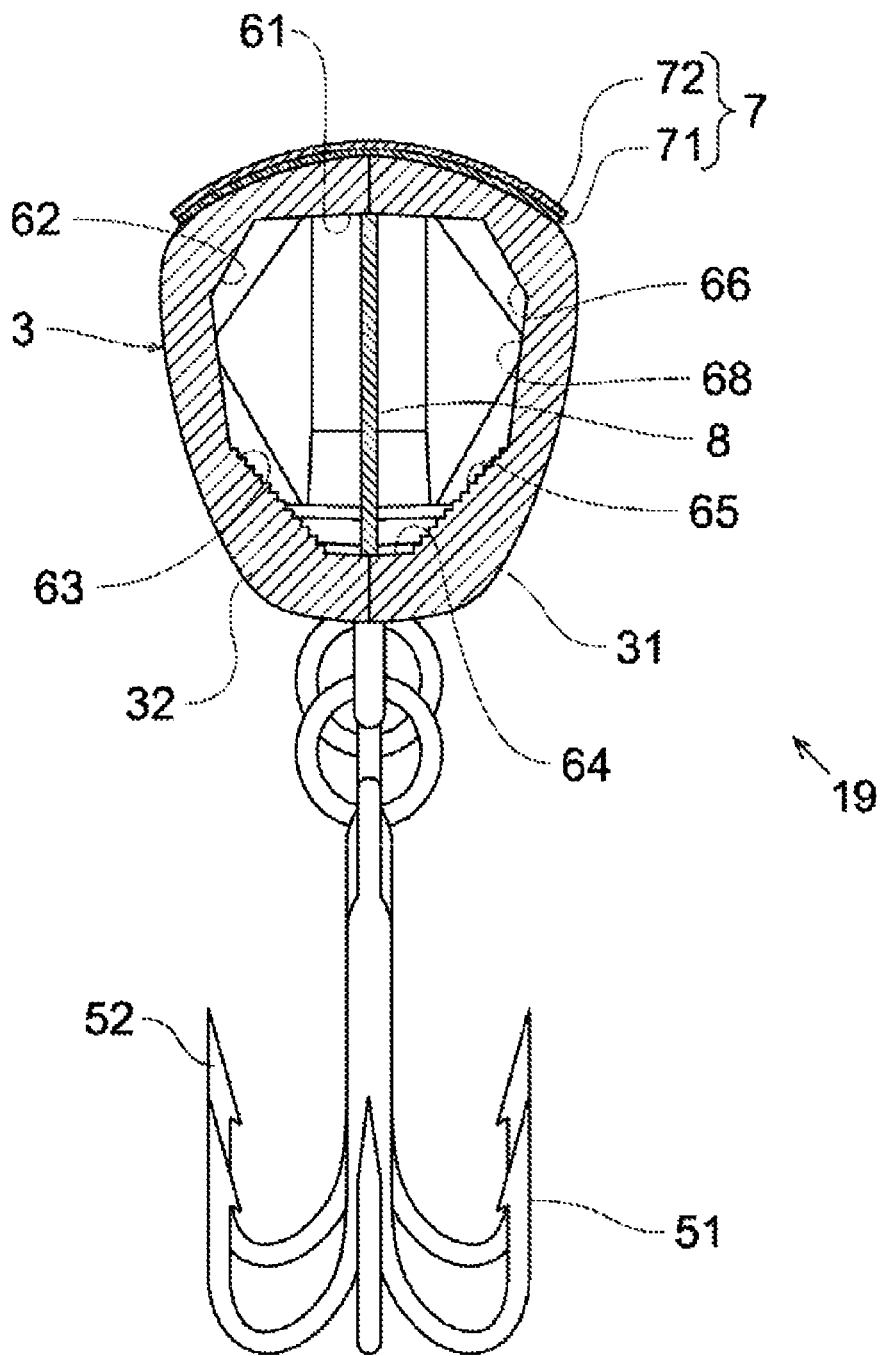
FIG. 17 is an enlarged sectional view of a lure in Ninth embodiment taken along the line similar to the line V-V in FIG. 3.

FIG. 17 shows an example of a lure 19 in Ninth embodiment in which any plane has minute irregularities. For example, in the lure 19, the third plane 63 and the fifth plane 65 of the body inner wall surface have minute irregularities.

As described above, it is preferred that at least the third plane 63 and the fifth plane 65 among the first plane 61 to eighth plane 68 have the minute irregularities. By setting at least the third plane 63 and the fifth plane 65 to be irregular planes, light reflected on the first colored portion 71 is further reflected on the core member 8 to reach the third plane 63 and the fifth plane 65, and is irregularly reflected on the planes 63 and 65. Thus, a faint color of the color of the first colored portion 71 appears in regions corresponding to the third plane 63 and the fifth plane 65.

(Tenth Embodiment)

The invention disclosed in the above-mentioned Patent Document 1 (Japanese Unexamined Patent Publication No. 2006-55062) may be applied to the body outer wall surface in First embodiment.

In other words, as disclosed in Patent Document 1, a plurality of long projections may be provided on the body outer wall surface side by side, one side surface of each of the long projections may be colored in a desired color (first colored portion), and the other side surface of each of the long projections may be colored in a color that is different from the first color (second colored portion).

(Other Embodiments)

In First embodiment, the core member 8 is a plate-like member. However, it is not limited to a plate-like member as long as it has light reflectivity. For example, the core member may be formed of a case that has a surface having light reflectivity and stores a rattle ball therein.

In the lure 1 of the present invention, a weight may be stored in the hollow portion 2 of the body 3, or a weight may be attached to a part of the body outer wall surface.

By forming the body 3 like a shrimp, the lure 1 of the present invention can be used as a lure for cuttlefish fishing.

1, 12, 13, 14, 18, 19 Lure; 2 Hollow portion; 3 Body; 4 Connecting portion; 51, 52 Fishhook; 61, 62, 63, 64, 65, 66, 67, 68 First plane, Second plane, Third plane, Fourth plane, Fifth plane, Sixth plane, Seventh plane, Eighth plane; 7 Multilayer colored region; 71 First colored portion; 72 Second colored portion; 8 Core member

What is claimed is:

1. A lure comprising:
a body having a hollow portion therein, the body being made of a translucent material, wherein
a body inner wall surface forming the hollow portion has a polyhedral structure including a first plane and a second plane connected to the first plane, and
a multilayer colored region including a first colored portion and a second colored portion directly stacked on and abutting the first colored portion, the second colored portion having a color that is different from that of the first colored portion, the multilayer colored region is provided on the first plane or a body outer wall surface corresponding to the first plane.

2. The lure according to claim 1, wherein
a core member is provided in the hollow portion of the body so as to divide the hollow portion of the body into two spaces extending in a long-axis direction of the body, and
at least one surface of the core member has light reflectivity.

3. The lure according to claim 2, wherein
the at least one surface of the core member is substantially orthogonal to the first plane.

4. The lure according to claim 1, wherein
the first plane is located on an upper side of the body, and the second plane is located on a lateral side of the body, and
the second plane is connected to the first plane with an obtuse angle with respect to the first plane.

5. The lure according to claim 1, wherein
when the body is cut at a first position and a second position along planes orthogonal to a long axis of the body, a sectional shape of the body inner wall surface cut at the first position is a hexagon, and a sectional shape of the body inner wall surface cut at the second position is an octagon.

6. The lure according to claim 1, wherein
at least a portion of the body inner wall surface has minute irregularities.

7. The lure according to claim 1, wherein the body inner wail surface has different polyhedral structures in a long-axis direction of the body.

* * * * *